United States Patent [19]
Gilbert

[11] Patent Number: 5,685,646
[45] Date of Patent: Nov. 11, 1997

[54] LINEAR BALL SLIDE

[75] Inventor: Steven J. Gilbert, Rochester, N.Y.

[73] Assignee: Automation Gages, Inc., Rochester, N.Y.

[21] Appl. No.: 679,769

[22] Filed: Jul. 15, 1996

[51] Int. Cl.⁶ .................................................. F16C 29/04
[52] U.S. Cl. .................................................. 384/49
[58] Field of Search ............................ 384/49, 51, 50, 384/56

[56] References Cited

U.S. PATENT DOCUMENTS

| | | | |
|---|---|---|---|
| 1,471,254 | 10/1923 | Forbes | 384/49 |
| 3,790,233 | 2/1974 | Polidor | 384/56 X |
| 4,334,717 | 6/1982 | Polidor | 384/49 |
| 4,929,097 | 5/1990 | Mottate | 384/49 |
| 4,961,649 | 10/1990 | Mottate | 384/49 |
| 4,973,291 | 11/1990 | Mottate | 384/49 X |
| 5,076,715 | 12/1991 | Saoyama et al. | 384/49 |

*Primary Examiner*—Thomas R. Hannon
*Attorney, Agent, or Firm*—Shlesinger Fitzsimmons Shlesinger

[57] ABSTRACT

The two sets of ball bearings which support an inverted, generally U-shaped slide on the base member of the assembly are carried in the leg sections of an inverted, generally U-shaped ball cage which is positioned between the base member and slide. A piston which is reciprocated by compressed air in a bore in the base member, is connected to the two leg sections of the ball cage by a dowel pin, whereby reciprocation of the piston is imparted to the ball cage and the bearings supported therein. A cylindrical coupling pin which is rotatably mounted intermediate its ends in a slot in the central portion of the ball cage, projects at opposite ends thereof slidably and rotatably into registering, diagonal grooves formed in confronting surfaces of the base member and slide, thereby coupling the cage to the slide and base member for movement in unison by the piston.

15 Claims, 2 Drawing Sheets

LINEAR BALL SLIDE

BACKGROUND OF THE INVENTION

This invention relates to improved linear ball slides or roller bearing slide assemblies, and more particularly to an improved such assembly in which the two sets of ball or rolling bearings of the assembly are mounted in a one-piece ball cage or retainer. Even more particularly this invention relates to an assembly of the type described in which the ball cage is coupled to both the base and slide members of the assembly, and travel of the slide is effected by directly driving the ball cage of retainer.

Most conventional ball or roller bearing slides comprise a male member having slots in the opposed, longitudinal side edges thereof for accommodating portions of two sets of ball or roller bearings, the opposite portions of each set of bearings extending into registering slots in the inside surfaces of the two legs of a generally U-shaped slide member. Typically, each set of ball or roller bearings is housed in a series of openings formed intermediate the ends of each of two, elongate retainer plates, which support the associated series of ball or roller bearings for limited movement longitudinally between the confronting surfaces of the male and female parts of the slide when one part is shifted longitudinally relative to the other. See for example the ball bearing supports in U.S. Pat. No. 4,334,717 and the roller bearing supports shown in U.S. Pat. No. 3,790,233.

For prior art slides of the type described above, force is usually transmitted to one or the other of the male and female parts, respectively, of the assembly. During such motion the two sets of ball or roller bearings and their respective retainer plates shift longitudinally of the assembly in one direction or the other between two limit positions. Since each ball or roller bearing retainer is shifted in response to the rotation of the balls or roller bearings during operation of the slide, any dislocation or skidding of the respective bearings relative to the confronting surfaces of the two slide members will result in undesirable migration or longitudinal displacement of one series of bearings relative to the other. Moreover, this migration can result in undesirable variation in the overall movement of one of the male and female members of the assembly relative to the other.

Also in connection with prior such slide assemblies it has been customary that one or the other of the two parts (the male and female parts) of the assembly be driven or moved directly by a driving mechanism, during which movement the two sets of bearings and their retainers travel only half the distance of the driven member. It has been discovered, however, that by suing a single ball cage for both sets of bearings, and by transmitting the driving force directly to the one ball cage, it is possible to accelerate the motion of the drive mechanism, and still maintain the 2 to 1 travel ratio between the assembly parts and the bearings, respectively. It has been found also that this improved means of transmitting drive to the assembly can be further enhanced by employing novel means for coupling the one ball cage to the male and female parts of the assembly.

Accordingly, it is an object of this invention to provide an improved linear ball or roller bearing assembly of the type in which an associated drive mechanism is connected directly to a single ball cage which is employed for supporting each of two series of ball or roller bearings which are interposed between the male and female members of a slide assembly.

Another object of this invention is to provide for an assembly of the type described novel coupling means interposed between the ball cage and the two members of a ball slide assembly and operative to eliminate undesirable slippage of the bearings during relative movement between the members.

Still another object of this invention is to provide an improved ball or roller bearing slide assembly of the type described in which undesireable bearing migration is eliminated by coupling together the two members of a slide assembly by means of a separate coupling element carried by the ball cage and operatively connected to both the male and female members of the slide assembly.

Other objects of the invention will be apparent hereinafter from the specification and from the recital of the appended claims, particularly when read in conjunction with the accompanying drawings.

SUMMARY OF THE INVENTION

The elongate base or male member of the assembly has supported for linear movement thereon by two sets of ball bearings an inverted, generally U-shaped female member or slide having spaced, parallel leg sections overlying and confronting upon the opposed side edges of the base member. An inverted, generally U-shaped ball cage is positioned between the base and slide member with each of the spaced, parallel leg sections thereof rotatably supporting one set of said ball bearings between each side of said base member and the confronting leg section of the slide.

Mounted to reciprocate in an axial bore that extends longitudinally through the base member is a piston, opposite ends of which communicate selectively with a supply of fluid under pressure, such a supply of compressed air. The leg sections of the ball cage are connected to the piston by a dowel pin, which extends between the cage leg sections, and through a diametral opening in the piston and registering slots in the base member at opposite sides of its axial bore, whereby reciprocation of the piston is imparted to the ball cage and the bearings supported therein.

To prevent undesirable slippage between the bearings and the slide and base members, a cylindrical coupling pin or puck is mounted intermediate its ends for rotation in a slot formed in the central portion of the ball cage to extend at right angles to the leg sections of the cage. Opposite ends of the coupling puck project slidably and rotatably into registering, diagonal grooves formed in the surfaces of the base and slide members, respectively, which confront upon opposite sides of the slotted central section of the ball cage. The centerlines of the respective grooves in the slide and base members are inclined at acute angles (e.g. 45°) with respect to the centerline of the slot in the ball cage, and are inclined at 90° to each other thereby coupling the cage to the slide and base members for movement in unison by the piston.

THE DRAWINGS

Figure 2:
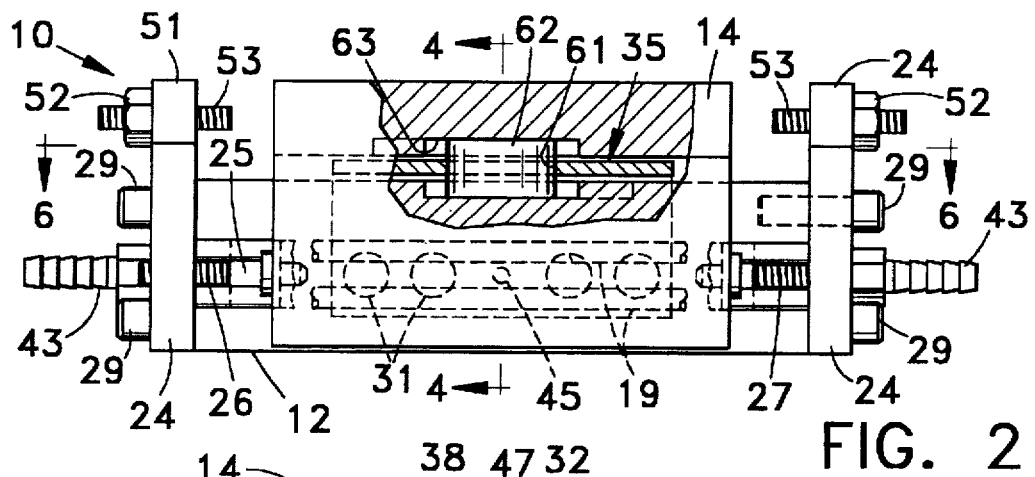
FIG. 2 is a side elevational view of this assembly with portions thereof broken away and shown in section.
Figure 5:
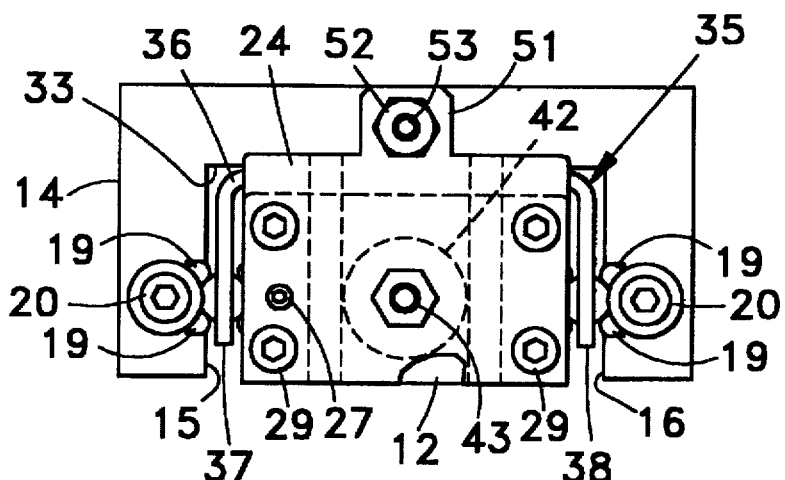
Figure 6:
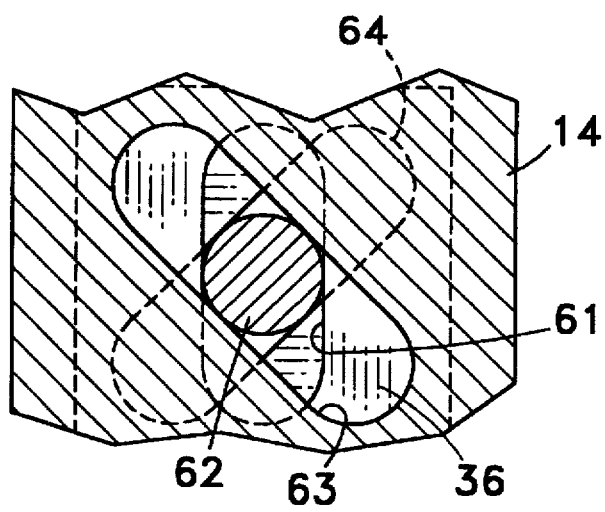

FIG. 5 is an end elevational view of this assembly as seen when looking at the right end of the assembly as shown in FIG. 2; and FIG. 6 is a fragmentary sectional view taken generally along the line 6—6 in FIG. 2 looking in the direction of the arrows, and illustrating the manner in which the shank of a circular coupling element is employed to couple together the ball cage and the two principal members of the slide assembly.

DETAILED DESCRIPTION OF THE PREFERRED EMBODIMENTS

Referring now to the drawings by numerals of reference, 10 denotes generally a linear ball slide mechanism comprising an elongate, generally rectangularly shaped male section or base member 12, and an inverted, generally U-shaped female section or slide member 14 that overlies the base section 12. The confronting, inside surfaces 15 and 16 of the legs or furcations of member 14 have formed therein longitudinally extending, rectangularly shaped grooves 17 and 18, respectively, and each of which contains a pair of spaced, parallel bearing rods 19 held in a conventional manner in the grooves by cap screws 20 that are threaded into opposite ends of member 14 to overlap opposite ends of the grooves.

Each pair of rods 19 confronts upon and is disposed in spaced, parallel relation to one of two like pairs of rods 21, one pair of which is mounted in a slot 22 (FIG. 3) formed in one longitudinal side edge of base 12, and the other pair of which is seated in the outer end an elongate slot 23 (FIGS. 3 and 4) formed in the other side edge of base 12. Opposite ends of slots 22 and 23 are closed by rectangular end plates 24, which are secured by screws 29 over opposite ends of the base member 12. The rods 21 in slot 23 are seated against the plane, outer surface of a tapered, generally wedge-shaped gib 25 that is mounted in slot 23 for limited adjustment longitudinally thereof. Screws 26 and 27 that are threaded through plates 24 into opposite ends of slot 23 to engage opposite ends of the gib 25 are adjustable to effect movement of gib 24 in a manner such as disclosed for example in U.S. Pat. No. 3,790,233.

Base member 12 is supported by two sets of ball bearings 31 and 32 (four bearings per set) in a rectangular recess 33 formed in the underside of member 14 between its grooved surfaces 15 and 16. Mounted in recess 33 between the base and slide members 12 and 14, respectively, is an inverted generally U-shaped ball cage denoted generally by the numeral 35. Cage 35 has a plane, flat central section 36 which overlies and is parallel to the top of base member 12, and two, spaced, parallel, downwardly projection leg sections 37 and 38, which extend between and in spaced, confronting relation to the rods 21 mounted in opposite sides of the base member 12, and the rods 19 mounted in the confronting surfaces 15 and 16 of member 14. The ball bearings 31 are mounted in longitudinally spaced openings in leg section 37 of cage 35 to have rolling engagement with the confronting pairs of rods 19 and 20 adjacent one side of the assembly, while leg section 38 carries the bearings 32 for rolling engagement with the pairs of rods 19 and 20 adjacent the opposite side of the assembly.

Mounted for limited axial reciprocation in a bore 41, which extends longitudinally through base member 12 and has opposite ends thereof sealed by the end plates 24, is a conventional piston 42. Threaded or otherwise secured in openings formed in the end plates 24 coaxially of the bore 41 are conventional, tubular fittings 43 which can be used in a known manner to connect opposite ends of the bore 42 selectively to one or more supplies of fluid such as compressed air. For example, as will be apparent to one skilled in the art, when it is desired to reciprocate the piston 42 in the bore 41, air under pressure is first applied to one of the fittings 43, at which time the opposite fitting is connected to the atmosphere or to a sump, in order to permit the compressed air entering one end of the bore 41 to shift the piston in one direction. To shift the piston 42 in the opposite direction this procedure obviously is reversed.

Reciprocable movement of the piston 42 is imparted to the ball cage 35 by virtue of a dowel pin 45, which is secured intermediate its ends in a diametral bore 46 formed in the piston 42 medially of its ends. Pin 46 extends at one end thereof through a longitudinally extending slot 47 formed in the base member 12 at one diametral side of the bore 41, and at its outer end extends into a registering opening in the leg section 38 of cage 35. At its opposite end the pin 45 extends through another slot 48 formed in the base member 12 at the side thereof opposite slot 47, and through a registering slot 49 in the gib 25 to a registering opening in the other leg section 37 of the cage 35. As a consequence, when the piston 42 is reciprocated, it transmits its reciprocation to the cage 35, and the slots 47, 48 and 49 permitting limited reciprocation of the connecting dowel pin 45 longitudinally relative to the base member 12. Thus, the cage 35 is reciprocated positively by the piston 42 relative to the base 12.

Figure 1:
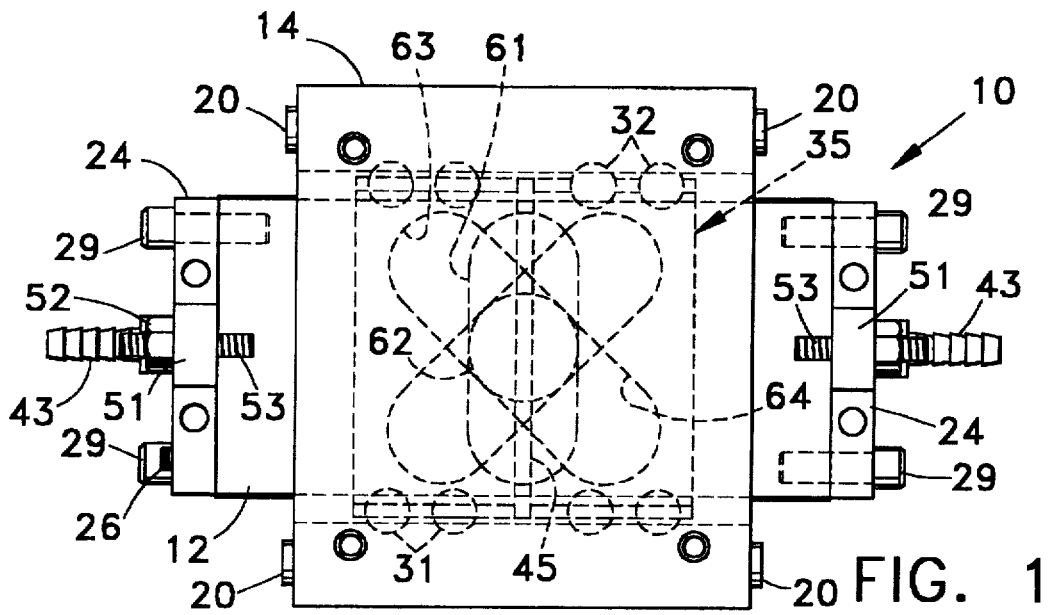
FIG. 1 is a top plan view of an improved linear ball slide assembly made according to one embodiment of this invention with portions thereof broken away.

As the cage 35 is reciprocated in response to movement of the piston 42, the bearings 31 and 32 carried thereby have rolling, driving engagement with the slide member 14. Thus, assuming that the base member 12 is fixed or remains stationary during movement of the cage 35, the slide 14 is caused to reciprocate back and forth on the base 12. To limit such reciprocable movement of the slide 14, each end plate 24 has projecting centrally from its upper edge an integral lug section 51. Secured intermediate its ends by a nut 52 in a registering opening in each lug section 51 is a nylon pin 53, which as shown in FIGS. 1 and 2 projects from the inner face of the associated lug section 51 and into spaced, confronting relation with one end of the slide 14. The nylon pins 53 thus are positioned to engage and limit the movement of the slide 14 longitudinally in one direction or the other relative to the base section 12. The nylon pins 53 can be adjusted to prevent any undesirable engagement of the dowel pin 45 with one or the other ends of the slots 47 and 48 in the base member 12. The slot 49 in the gib 25, of course, is long enough to permit adjustment of the gib without interfering with reciprocation of the dowel pin 45, thus enabling the gib 25 to take up any undesirable slack which might otherwise exist between the two sets of ball bearings, as taught in the above-noted U.S. Pat. No. 3,790,233.

Rotably mounted intermediate its ends in a slot 61, which is formed in the central section 36 of cage 35 with its centerline extending normal to the leg sections 37 and 38 of the cage, is a cylindrical coupling pin or puck-shaped element 62. The coupling element 62, which in the embodiment illustrated has a diameter only slightly smaller than the width of the slot 61, has an overall axial length only slightly greater than the slotted central section 36 of the cage 35. Opposite ends of element 62 project slidably and rotatably into registering portions of a pair of inclined or diagonal grooves 63 and 64, the former of which is formed in the plane, inside surface of the slide member 12 which overlies and is parallel to the central section 36 of the cage 35, and the latter of which is formed in the plane, upper surface of the base member 12, which confronts upon and is parallel to the underside of the central section 36 of the cage 35.

Figure 3:
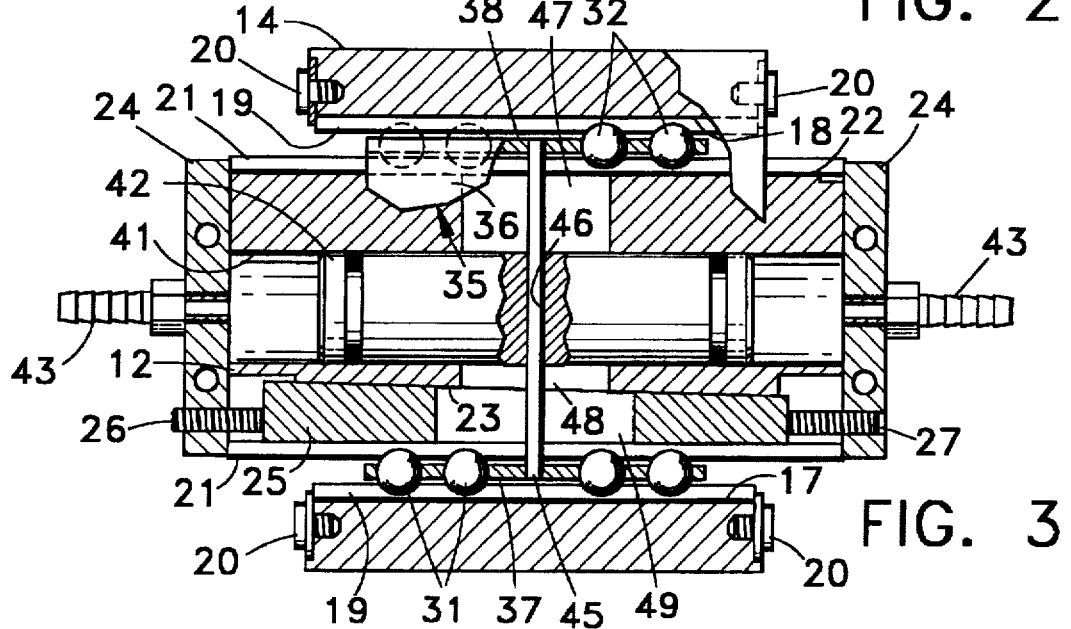
FIG. 3 is a plan view of this assembly as shown in FIG. 1, but with portions thereof broken away and shown in section.
Figure 4:
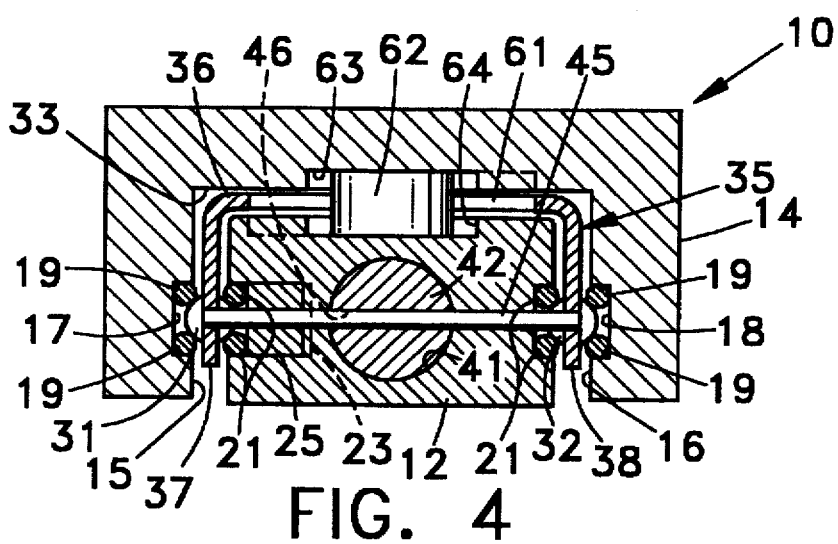
FIG. 4 is a cross sectional view of this assembly taken generally along the line 4—4 in FIG. 2 looking in the direction of the arrows, and with portions thereof shown in full.

As shown more clearly in FIG. 6, the grooves 63 and 64 are similar in the configuration to the slot 61, but have their respective centerlines inclined at an acute angle to the centerline of the slot 61, by way of example at an angle of 45°, while the centerlines of the grooves 63 and 64 are inclined at right angles to each other. As a consequence of this construction, as the piston 42 drives the cage 35 in one direction, for example toward the left from its centered position as shown in FIG. 3, the coupling pin 62 will be translated toward the left by virtue of the slot 61, and at the same time, by virtue of the movement of the groove 63 toward the left in FIG. 6 relative to the underlying groove 64, the coupling pin 62 will roll diagonally upwardly toward the left to the end of slot 63. On the other hand, if the slide is shifted from its centered position as shown in FIG. 3 toward the right, the pin 62 again will be moved toward the right in FIG. 3 relative to the base 12, and diagonally downwardly from its position as shown in FIG. 6. In any event, the presence of the rotatable coupling member affirms that the two sets of ball bearings will always move in unison, and will be prevented from shifting relative to one another during reciprocable movement of one member of the assembly relative to the other, thereby eliminating any undesirable bearing migration during such movement. The coupling element also functions to eliminate any undesirable slipping of the ball bearings during such movement.

From the foregoing it will be apparent that the present invention provides a relatively simple and inexpensive means for providing an improved and very compact ball slide which by virtue of having the ball cage driven directly by a drive mechanism, enables it positively to accelerate the motion of the slide members one relative to the other. This construction also enables at least the usual 2:1 transmission differential, whereby during travel of the slide in one direction on the base member, the slide will travel twice the linear distance of the ball cage. Moreover, by virtue of the use of the coupling member 62, undesirable migration or bearing slippage is substantially eliminated.

While this invention has been illustrated and described in detail in connection with only certain embodiments thereof, it will be apparent to one skilled in the art that it is capable of still further modification, and that this application is intended to cover any such modifications as may fall within the scope of one skilled in the art, or the appended claims.

I claim:

1. An anti-friction slide assembly, comprising
a pair of elongate members,
means forming on each of said members a pair of laterally spaced, longitudinally extending, parallel bearing races,
means mounting said members for longitudinal reciprocation relative to each other, and with the two races of one pair thereof confronting upon and registering with, respectively, the two races of the other pair thereof,
said mounting means including a bearing retainer interposed between said members for limited longitudinal reciprocation relative thereto, and having two laterally spaced, linear sets of bearings rotatably mounted thereon adjacent opposite sides thereof,
said retainer supporting each of said sets of bearings for limited longitudinal reciprocation therewith between a confronting pair of said races and with the bearings of each set thereof having rolling, driving engagement with each race of the associated pair of confronting races, and
drive means mounted on one of said members for longitudinal reciprocation relative thereto by a driving mechanism separate from said slide assembly, and
means connecting said drive means to said retainer and operative to impart the reciprocation of said drive means to said retainer.

2. An anti-friction slide assembly,
a pair of elongate members,
means forming on each of said members a pair of laterally spaced, longitudinally extending, parallel bearing races,
means mounting said members for longitudinal reciprocation relative to each other, and with the two races of one pair thereof confronting upon and registering with, respectively, the two races of the other pair thereof,
said mounting means including a bearing retainer interposed between said members for limited longitudinal reciprocation relative thereto, and having two laterally spaced, linear sets of bearings rotatably mounted thereon adjacent opposite sides thereof,
said retainer supporting each of said sets of bearings for limited longitudinal reciprocation therewith between a confronting pair of said races and with the bearings of each set thereof having rolling, driving engagement with each races of the associated pair of confronting races, and
drive means connected to said retainer and operable to reciprocate said retainer and said sets of bearings, thereby to effect longitudinal reciprocation of said members relative to each other,
a coupling element rotatably mounted intermediate its ends in an opening in said retainer for longitudinal reciprocation therewith, and for rotation about an axis extending transversely of the reciprocable movement of said retainer, and
opposite ends of said coupling element being connected to said members and being operative to prevent slippage of said bearings during rolling, driving engagement thereof with the pair of confronting races associated therewith.

3. An anti-friction slide assembly as defined in claim 2, wherein
said opening in said retainer is an elongate slot formed through a portion of said retainer that extends between confronting surfaces on said members,
each of said confronting surfaces of said members has therein an elongate groove at least a portion of which registers with said slot, and
opposite ends of said coupling element are seated in said grooves.

4. An anti-friction slide assembly as defined in claim 3, wherein
said slot extends transversely of the direction in which said retainer reciprocates, and
each of said grooves extends in a direction inclined to each other and to the direction in which said retainer reciprocates.

5. An anti-friction slide assembly as defined in claim 4, wherein
said slot extends at right angles to the directions in which said linear sets of bearings extend, and
said grooves extend at right angles to each other.

6. An anti-friction slide assembly as defined in claim 5, wherein said retainer and said coupling element reciprocate in unison approximately one half the distance said members reciprocate relative to each other.

7. An anti-friction slide assembly as defined in claim 1, wherein said drive means comprises a piston mounted to reciprocate in a bore in said one member, and said connecting means includes a pin carried by said piston and secured to said retainer to impart the reciprocation of said piston to said retainer.

8. An anti-friction slide assembly comprising a pair of elongate members, means forming on each of said members a pair of laterally spaced, longitudinally extending, parallel bearing races, means mounting said members for longitudinal reciprocation relative to each other, and with the two races of one pair thereof confronting upon and registering with, respectively, the two races of the other pair thereof, said mounting means including a bearing retainer interposed between said members for limited longtitudinal reciprocation relative thereto, and having two laterally spaced, linear sets of bearings rotatably mounted thereon adjacent opposite sides thereof, said retainer supporting each of said sets of bearings for limited longitudinal reciprocation therewith between a confronting pair of said races and with the bearings of each set thereof having rolling, driving engagement with each race of the associated pair of confronting races, and drive means connected to said retainer and operable to reciprocate said retainer and said sets of bearings, thereby to effect longitudinal reiprocation of said members relative to each other, said drive means comprising a drive element mounted on one of said members for limited reciprocation longitudinally thereof, and disposed to be reciprocated by a driving mechanism separate from said slide assembly, and means securing said retainer to said drive element for reciprocation therewith.

9. An anti-friction slide assembly as defined in claim 8, wherein said drive element is the piston of an air cylinder secured in a bore in said one member and disposed to be connected selectively to a supply of compressed air to effect reciprocation of said piston.

10. An anti-friction slide assembly, comprising a pair of elongate members, means forming on each of said members a pair of laterally spaced, longitudinally extending, parallel bearing races, means mounting said members for longitudinal reciprocation relative to each other, and with the two races of one pair thereof confronting upon and registering with, respectively, the two races of the other pair thereof, said mounting means including two, parallel, linear sets of bearings each of which sets is mounted for limited longitudinal reciprocation between a confronting pair of said races and with the bearings of each set thereof having rolling, driving engagement with each race of the associated pair of confronting races, and migration control means including a coupling element operatively connected to said sets of bearings for longitudinal reciprocation therewith, opposite ends of said coupling element being connected to said members and being operative to prevent slippage of said bearings during rolling, driving engagement thereof with the pair of confronting races associated therewith, drive means mounted on one of said members for longitudinal reciprocation relative thereto, and means connecting said drive means to said retainer and operative to impart the reciprocation of said drive means to said retainer.

11. An anti-friction slide assembly as defined in claim 10, wherein said migration control means further includes a bearing retainer interposed between confronting surfaces of said members for reciprocation with said coupling element, and each of said sets of bearings being rotatably supported in said retainer for reciprocation therewith.

12. An anti-friction slide assembly as defined in claim 11, wherein said coupling element comprises a member slidably mounted intermediate its ends in a slot in said retainer for reciprocation in said slot during reciprocation of said retainer, and opposite ends of said coupling element are seated slidably in registering grooves formed in said confronting surfaces of said members.

13. An anti-friction slide assembly as defined in claim 12, wherein said slot extends at right angles to the directions in which said sets of bearings extend, and said grooves extend in directions that are inclined to each other and to the direction in which said slot extends.

14. An anti-friction slide assembly as defined in claim 13, wherein each of said grooves extends in a direction inclined at right angles to the direction in which the other of said grooves extends.

15. An anti-friction slide assembly as defined in claim 11, wherein said drive means comprises a piston mounted to reciprocate in a bore in said one member, and said connecting means includes a pin carried by said piston and secured to said retainer to impart the reciprocation of said piston to said retainer.

* * * * *